(12) United States Patent
Ippolito et al.

(10) Patent No.: US 6,687,058 B1
(45) Date of Patent: Feb. 3, 2004

(54) NUMERICAL APERATURE INCREASING LENS (NAIL) TECHNIQUES FOR HIGH-RESOLUTION SUB-SURFACE IMAGING

(75) Inventors: Stephen B. Ippolito, Tampa, FL (US); M. Selim Unlu, Jamaica Plain, MA (US); Bennett B Goldberg, Newton, MA (US)

(73) Assignee: The Trustees of Boston University, Boston, MA (US)

( * ) Notice: Subject to any disclaimer, the term of this patent is extended or adjusted under 35 U.S.C. 154(b) by 0 days.

(21) Appl. No.: 10/019,133

(22) PCT Filed: Jun. 20, 2000

(86) PCT No.: PCT/US00/40253

§ 371 (c)(1),
(2), (4) Date: Dec. 20, 2001

(87) PCT Pub. No.: WO00/07313

PCT Pub. Date: Dec. 28, 2000

Related U.S. Application Data (60) Provisional application No. 60/140,138, filed on Jun. 21, 1999.

(51) Int. Cl.[7] ............................................... G02B 21/02
(52) U.S. Cl. ........................................ 359/656; 359/661
(58) Field of Search ................................. 359/642, 644, 359/656, 661; 369/112.01, 44.22, 44.14

(56) References Cited

U.S. PATENT DOCUMENTS

| | | | | |
|---|---|---|---|---|
| 5,193,132 A | * | 3/1993 | Uken et al. | .................... 385/32 |
| 5,208,648 A | | 5/1993 | Batchelder et al. | ......... 356/237 |
| 5,487,058 A | * | 1/1996 | Kitabayashi | ........... 369/112.26 |
| 5,497,359 A | | 3/1996 | Mamin et al. | ........... 369/44.15 |
| 5,764,613 A | | 6/1998 | Yamamoto et al. | .... 369/112.24 |

* cited by examiner

Primary Examiner—Jordan M. Schwartz
Assistant Examiner—Jessica Stultz
(74) Attorney, Agent, or Firm—Weingarten, Schurgin, Gagnebin & Lebovici LLP (57) ABSTRACT

A viewing enhancement lens (18-NAIL) which functions to increase the numerical aperture or light gathering or focusing power of viewing optics such as a microscope (26) used to view structure within a substrate such as a semiconductor wafer or chip or of imaging optics such as media recorders. The result is to increase the resolution of the system by a factor of between n, and $n^2$, where n is the index of retraction of the lens substrate.

52 Claims, 8 Drawing Sheets

NUMERICAL APERATURE INCREASING LENS (NAIL) TECHNIQUES FOR HIGH-RESOLUTION SUB-SURFACE IMAGING

CROSS REFERENCE TO RELATED APPLICATIONS

This application claims priority under 35 U.S.C. §119(e) to Provisional Application No. 60/140,138, filed Jun. 21, 1999; the disclosure of which is incorporated herein by reference.

ACKNOWLEDGMENT OF GOVERNMENT SUPPORT

This invention was made with government support under Grant Number ECS-9625236 awarded by the National Science Foundation and under Contract Number 1210800 awarded by DARPA. The Government has certain rights in the invention.

BACKGROUND OF THE INVENTION

Standard optical microscopy is not capable of obtaining a transverse resolution with a definition better than approximately half a wavelength of light due to the diffraction limit, also termed the Rayleigh or Abbe limit. The diffraction limited spatial resolution is $\gamma/(2\,NA)$ where $\gamma$ is the wavelength of collected light in free space. The Numerical Aperture is defined as $NA=n\,\sin\theta_a$ where n is the refractive index of the material and $\theta_a$ is the collection angle, the half-angle of the optical collection area. In order to improve resolution of diffraction limited microscopy the NA must be increased. The highest NA values for standard microscope objectives in air ambient are less than 1, with typical best values around 0.6.

One method to increase the NA is to increase the index n of the material where the collection focus is formed. Insertion of a high index fluid, such as oil, between the microscope objective lens and the sample allows for higher NA, with typical best values around 1.3. Similarly, a microscope design utilizing a high index hemispherical lens, called a Solid Immersion Lens (SIL), closely spaced to the sample can provide a resolution improvement of 1/n. The SIL microscope relies on evanescent coupling between the light focussed in the high index SIL AND THE SAMPLE. Previous patents on SIL microscopy describe arrangements where the light is focussed at the geometrical center of the spherical surface of the SIL.

Subsurface imaging of planar samples is normally accomplished by standard microscopy. The NA remains the same when imaging below the surface of higher index samples, because the increase in index is exactly counterbalanced by the reduction of $\sin\theta_a$ from refraction at the planar boundary. Standard subsurface imaging also imparts spherical aberration to the collected light from refraction at the same planar boundary. The amount of spherical aberration increases monotonically with increasing NA. Subsurface imaging has been conducted through Silicon substrates at wavelengths of 1.0 μm and longer, with best values of transverse resolution around 1.0 μm.

The use of SIL microscopy has been suggested for sub-surface imaging wherein the light phase fronts are geometrically matched to the SIL surface. However, the method described is limited to an arrangement where a hemispherical lens collects light from a focus at the geometrical center of the spherical surface of the lens. In this case, the resolution improvement is limited to 1/n, and the spherical aberration free area is limited to a point. An image can be formed by scanning the sample and SIL where the scan precision is relaxed by a factor of n. An image can also be formed by scanning the sample and holding the SIL stationary. The characteristics of the invention described below are an improvement over those of standard and SIL microscopy for many sub-surface applications.

BRIEF SUMMARY

The present invention provides a substrate surface placed lens for viewing or imaging to or from a zone of focus within the substrate and providing an increase in the numerical aperture of the optical system over what it would be without the lens. The enhanced numerical aperture translates into an improvement in resolution in collecting or illuminating. The focus at a specific zone within the substrate is made aberration free, providing a broad lateral extent to the field of view. Substrate and lens material are close if not identical in index of refraction, n.

The invention finds application in viewing semiconductor devices and circuits, bio/chem specimens from the underside of an attachment surface, layered semiconductor and dielectrics such as boundaries of Silicon-on-Insulator substrates, and read/write functions of buried optical media.

DESCRIPTION OF THE DRAWING

These and other features of the invention are described below in the Detailed Description and in the accompanying Drawing of which.

DETAILED DESCRIPTION

The present invention provides a viewing enhancement lens (NAIL) which functions to increase the numerical aperture or light gathering power of viewing optics such as a microscope used to view structure within a substrate such as a semiconductor wafer or chip or of imaging optics used to expose material such as data media. The result is to increase the resolution of the system by a factor of between n and $n^2$ where n is the index of refraction of the lens and substrate. While the lens and substrate are typically of the same index of refraction, a near match will provide similar advantages.

Figure 1:
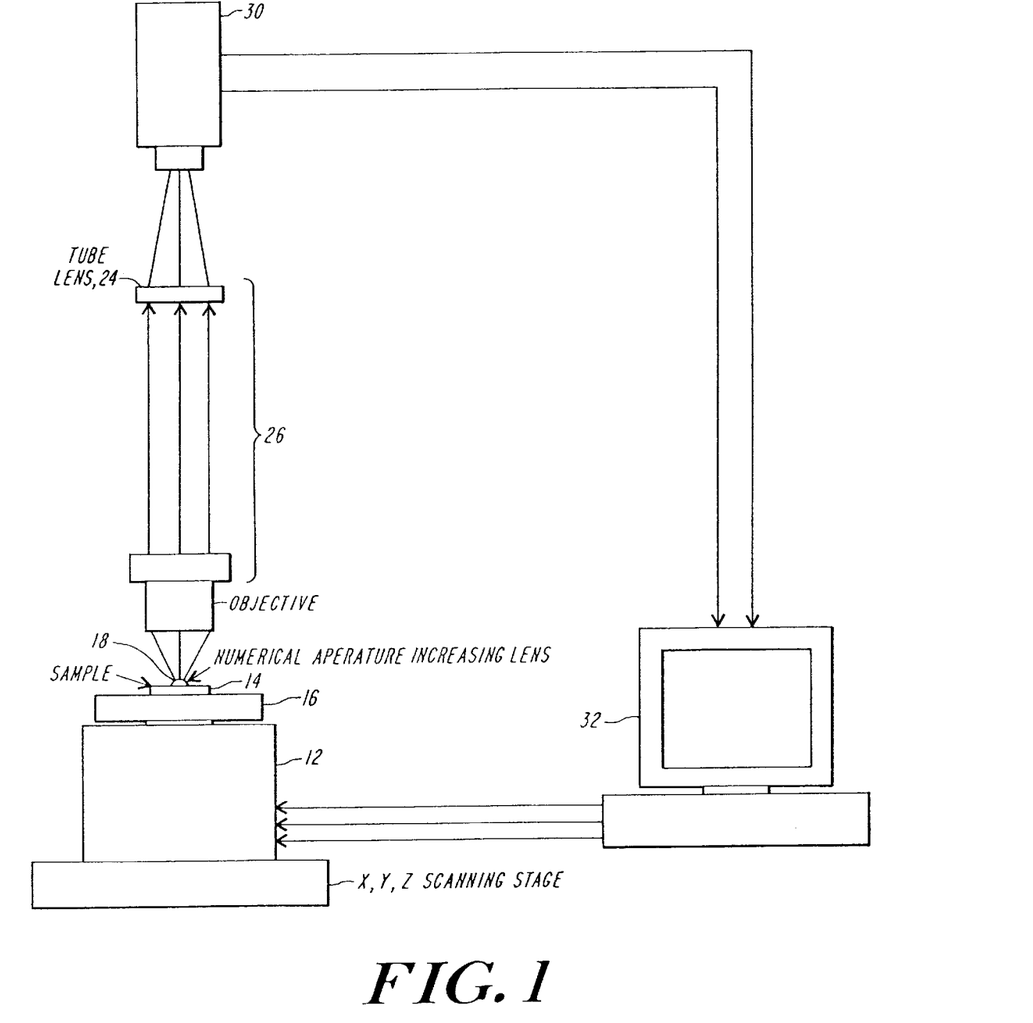
FIG. 1 illustrates an imaging system having a numerical aperture increasing lens (NAIL) according to the invention.

FIG. 1 illustrates such a viewing system in which a computer controlled XYZ motion support 12 holds a specimen 14 in a holder 16. A numerical aperture increasing lens (NAIL) 18 is placed over the specimen. The NAIL and specimen typically are polished to allow an intimate contact as free of air space as possible, at least within a fraction of a wavelength sufficiently small to avoid reflection effects at the NAIL and substrate boundary. Light from objects within the substrate 14, typically from back illumination provided by holder 16 or from surface illumination from above, passes through the NAIL 18 and thence through an objective lens 20 and exit lens 24 of a microscope system 26 into a video camera 30 or other viewing, recording or imaging element. Signals from the camera 30 are fed to a computer 32 or other processing, storage and/or viewing system for display and recordation. This allows for the recordation of a sequence of images over time, which in turn allows for time-resolved measurements. The computer may also be programmed to operate the stage 12 for manual or automated scanning in X, Y, and/or Z to capture images over a two or three-dimensional region.

Figure 2A:
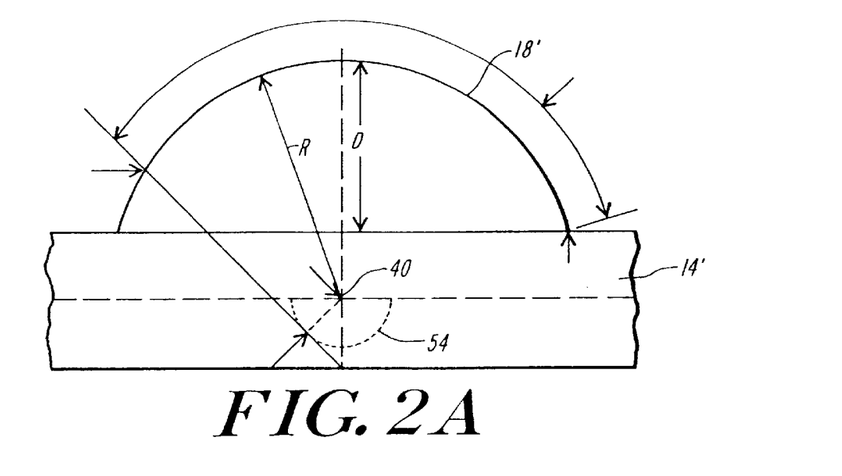
FIG. 2a is a sectional view of a NAIL and substrate in typical viewing relationship.

FIG. 2a illustrates a NAIL 18' and substrate 14' in larger scale. The NAIL 18' typically is less than a complete hemisphere, having a vertical thickness D, and thus its center, distant from the outer surface by the radius of curvature, R, will be located within the substrate 14' at a point 40. While the NAIL will increase the numerical aperture of the viewed objects as noted above, it is also desired to have a view which is aberration free. There is a spherical surface within the substrate, depending on its depth, at which focus occurs and aberration free viewing is obtained. This is deeper than the point 40 as explained below. There is a distance either side of this spherical surface at which the field of view is also aberration or substantially aberration free, giving a plane region where objects can be viewed with increased resolution and freedom from aberrations. With X the distance into the substrate of the field of view, then $D=R(1+1/n)-X$. Radiation phase fronts passing through the NAIL in either direction are geometrically distinct from the convex surface of the NAIL thereby providing viewing into or from a substrate depth well beyond the NAIL.

Figure 2B:
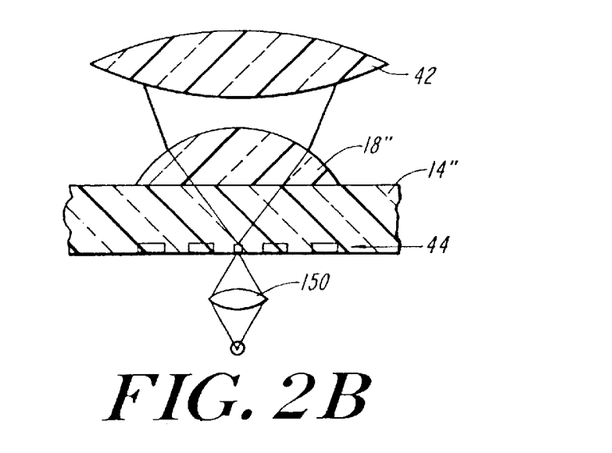
FIG. 2b is a sectional view of a NAIL and viewing objective for viewing into the interior of a substrate.
Figure 2C:
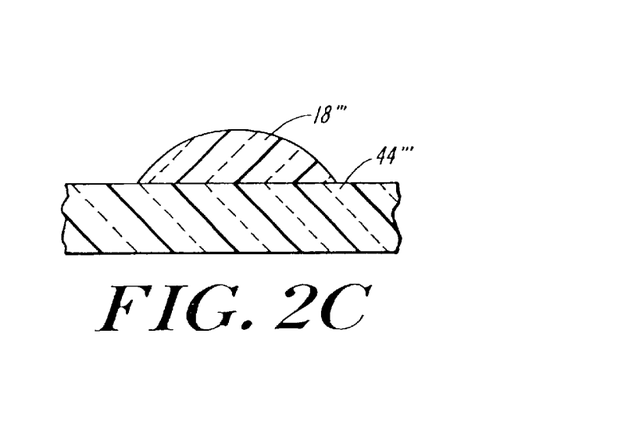
FIG. 2c is a sectional view of a generalized NAIL and substrate relationship illustrating a range of applications for the invention.

FIG. 2b shows viewing within a substrate 14" through a NAIL 18" by an objective 42 of a field of view 44 at the bottom of the substrate 14". The field of view can for example include the underside of processed regions of a semiconductor wafer containing information relevant to the quality of the resulting semiconductor chip or other element. In general, as shown in FIG. 2c, the, NAIL 18''' and a substrate 14''' can be any elements where it is desired to view with enhanced resolution into a field of view within the substrate. Examples include microscope slide and cover glass with a NAIL on top and thermal imaging of heat emitting semiconductors in operation.

Figure 3:
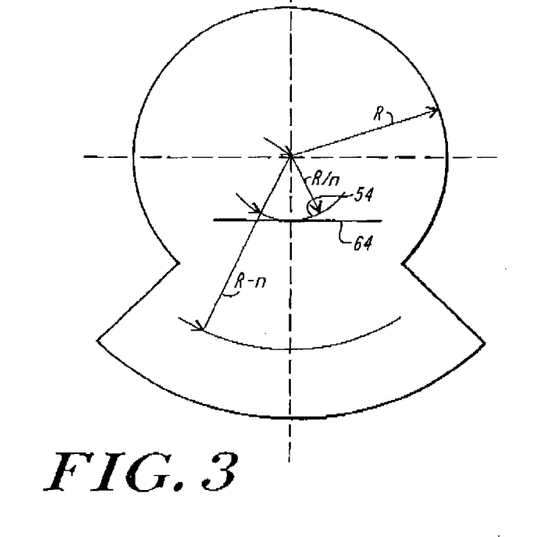
FIG. 3 is a sectional view of a medium illustrating the geometric and mathematical relationships of NAIL surfaces and planes of aberration free focus.

FIG. 3 is of a unitary, solid object 50, an upper part 52 of which represents the NAIL of the invention and the remainder a substrate that is to be viewed into to see a field of view at the spherical surface 54 free of aberration. An imaginary plane 58 marks the dividing line between the NAIL and the substrate. The surface 54 is defined by R/n as the depth below the center 60 of curvature of the NAIL 52.

For optimal resolution, the optics of the microscope are best matched to those of the NAIL. This is achieved when the following relation is satisfied:

$$s=(-f_1^2)/R(n+1/n);$$

where $f_1$ is the objective focal length, and the inter lens principle points distance (objective to exit lens principle points)=$s+f_1+f_2$, $f_2$ being the exit lens focal length.

The advantage of aberration free focal points includes a region either side of the spherical surface 54 allowing plane 64, which typically contains the areas of interest, to also be substantially aberration free as shown in FIG. 3.

An additional advantage of the NAIL lens is that fewer steps are needed to build an image since the aberration free region has a broad lateral extent, relatively. Thus off-axis viewing is acceptable over a greater range. To accommodate different substrate depths, different NAILs will typically be used, leading to the use of NAIL sets and arrays of NAILs. The NAIL may also be coated to minimize reflections for background or foreground illumination. The NAIL may be fabricated as a compound lens and/or have an objective design to correct for chromatic aberration.

Figure 4A:
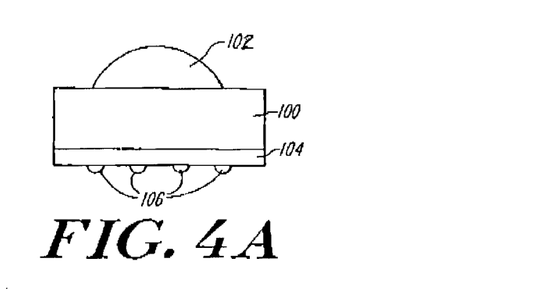
FIGS. 4a–4b illustrate additional uses for a NAIL of the invention in inspecting specimens on a bottom surface of a substrate.

FIG. 4A illustrates a further use of the invention in testing biological or chemical specimens for changes or conditions of optical properties. A substrate 100 has a NAIL lens 102 thereover as above. The substrate may have an insulating or other layer 104 to allow adherence of a specimen 106. The surface of the specimen is located at the zone of focus, typically corresponding to focus zone 54 where any optical properties in ambient or applied transmitted or reflected light can be viewed through the NAIL 102 with enhanced resolution. The substrate may have a semitransparent metal thereon for such purposes as enhanced specimen bonding.

Figure 4B:
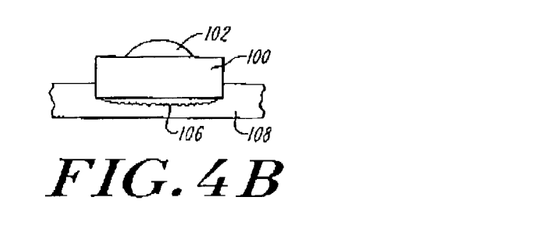

The specimen 106 such as shown in FIG. 4b, can be placed in an environment such as defined by a housing 108 where excitation, such as microwave energy, or a fixed or changing chemical environment can be applied to the specimen 106.

Figure 5:
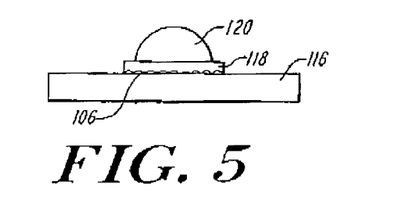
FIG. 5 illustrates the application of the invention in use in specimen viewing under a cover slip.

FIG. 5 illustrates the application of the invention to use in viewing specimens 106 on a substrate 116 such as a microscope slide with a cover slip 118 over the specimen 106. A NAIL lens 120 is placed over the cover slip and the materials are dimensioned to provide a zone of aberration free focus at the specimen 106 as above. A NAIL lens can be placed on the substrate with this same zone of focus as described above.

Figure 6:
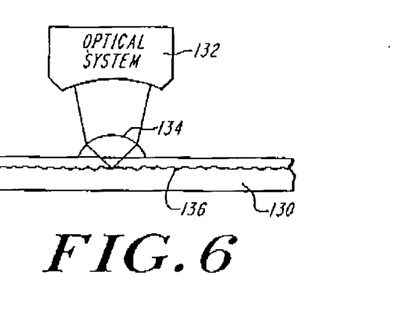
FIG. 6 illustrates the use of the invention in the area of read/write media.

In FIG. 6 the NAIL of the invention is illustrated in use for the creation and reading of media. In this case, the substrate 130 includes a read or write or read/write medium such as is used in CD, DVD, Minidisk players and recorders. An optical system 132 is shown to illustrate the well-known apparatus for writing and/or reading to and from such media. A NAIL 134 provides a zone of focus at a plane occupied by a layer 136 which is responsive to input laser light (with or without other influences such as a magnetic field) from one version of the system 134 to create a permanent or erasable record in the layer which can be later read by a further version of the system 132.

Figure 7A:
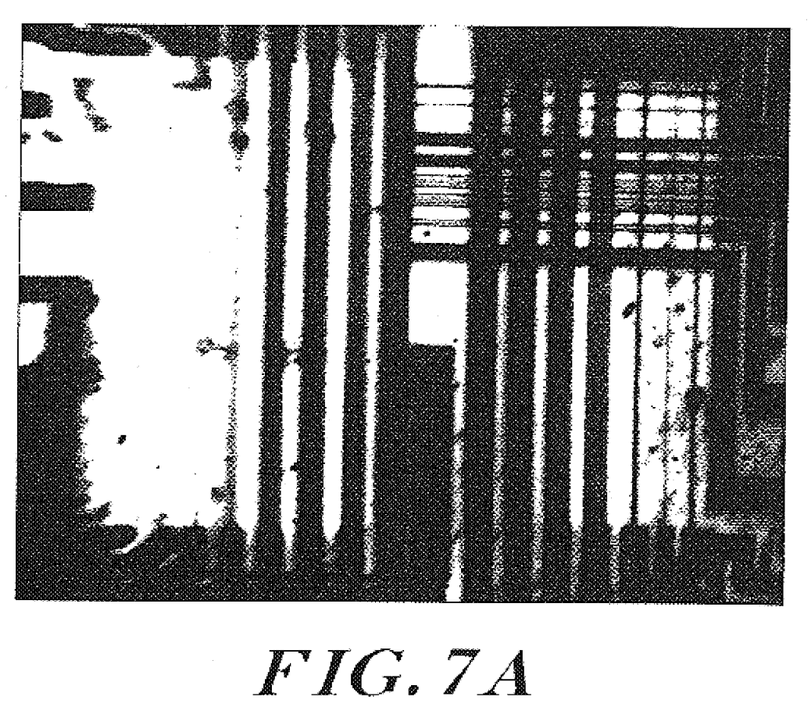
FIGS. 7a–7d illustrate actual images from the use of the invention in viewing semiconductor structure.
Figure 7B:
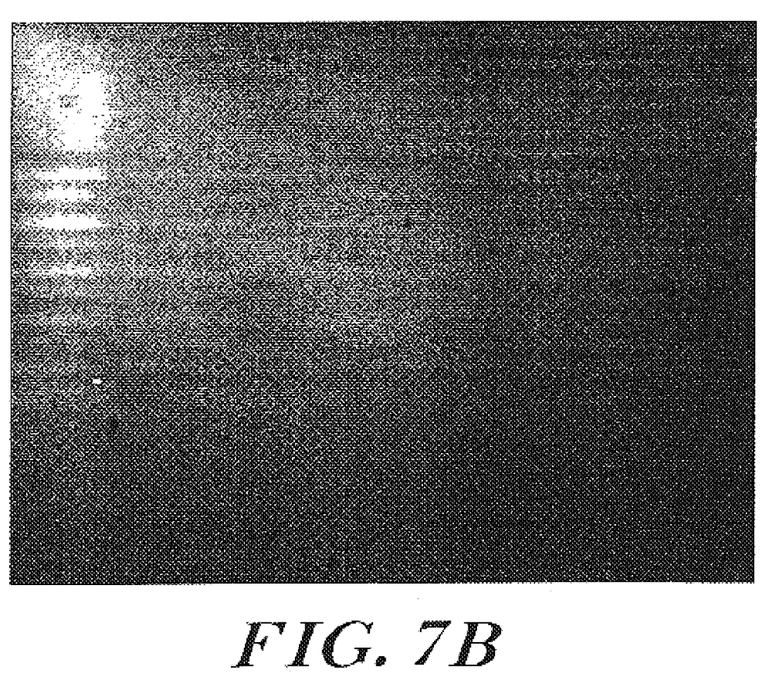
Figure 7C:
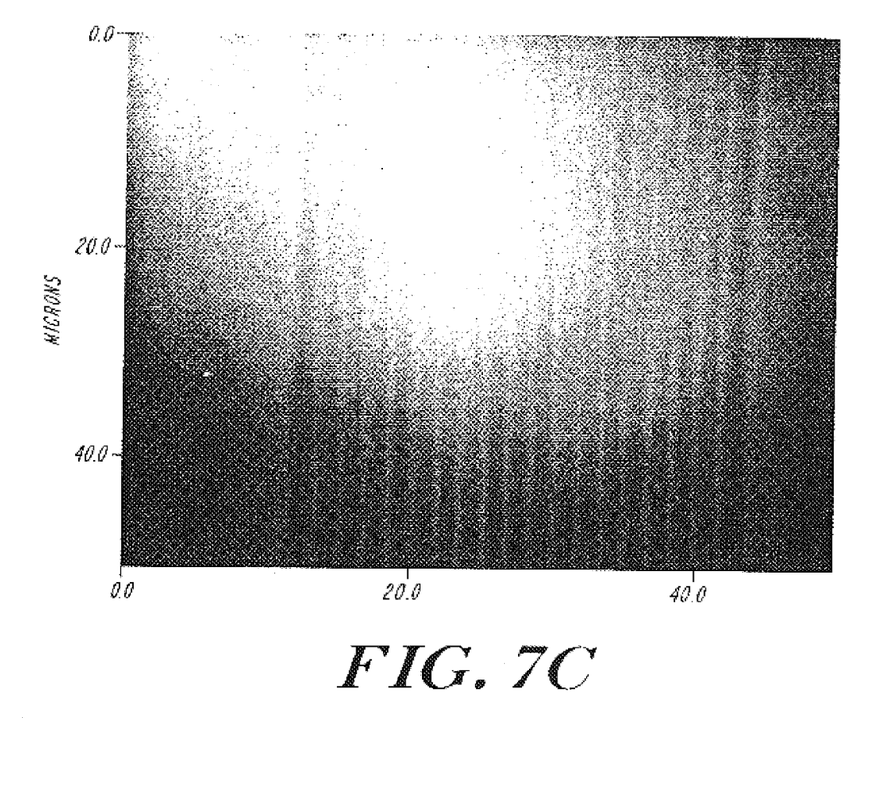
Figure 7D:
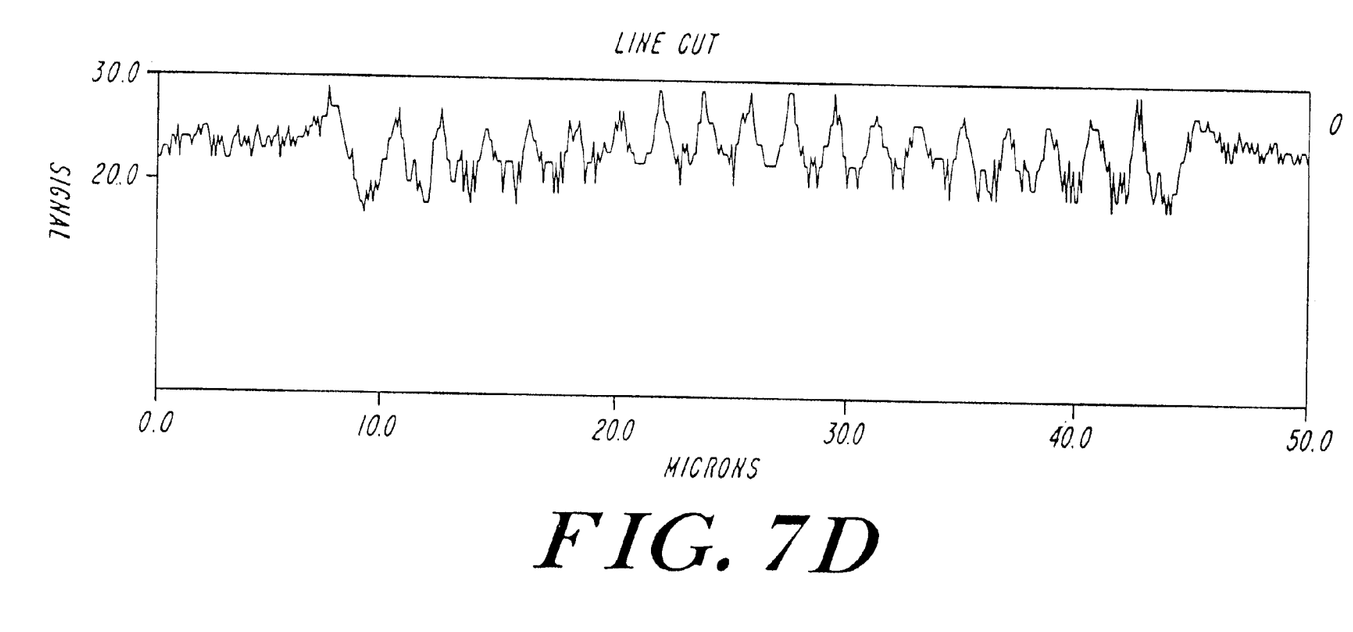

FIGS. 7a–7d show the results of actual NAIL usage to image a layer of semiconductor structure as might be exemplified by FIG. 2b using a back lighting system 150. FIG. 7a illustrates the image of structure obtained with a normal 5.4× microscope without a NAIL. FIGS. 7b and c illustrate the view using a NAIL over the semiconductor substrate. Polysilicon test lines and an N-type diffusion fabricated into the semiconductor at locations 140 and 142 respectively are clearly shown. FIG. 7d shows a linear scan across the image of FIG. 7c indicating the sharp resolution at an enhanced total magnification of approximately 96×.

Figure 8:
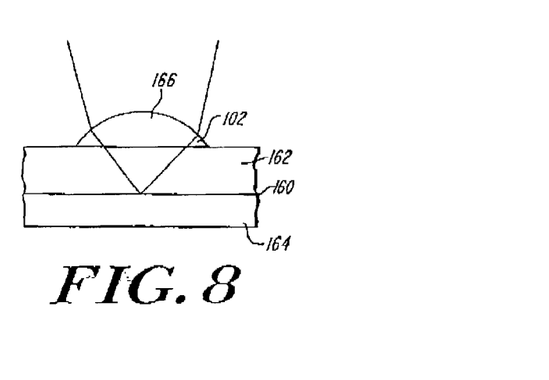
FIG. 8 illustrates the invention in SOI devices for boundary inspection;.

The invention is also useful in examining the junction in semiconductor devices formed between silicon and an insulator in Silicon-on-Insulator fabrication by placing the junction at the zone of focus and aberration free viewing as shown in FIG. 8. Here the layer 160 represents a boundary between semiconductor material 162 and insulator 164. A NAIL 166 allows enhanced inspection of this boundary. In the case of a semiconductor material as the NAIL and/or substrate, the materials of Si, Ge, SiGe, GaAs, GaSb, GaP, InP, GaN or combinations including combination of the basic atoms in tertiarary or higher structures are useful among others.

Figure 9A:
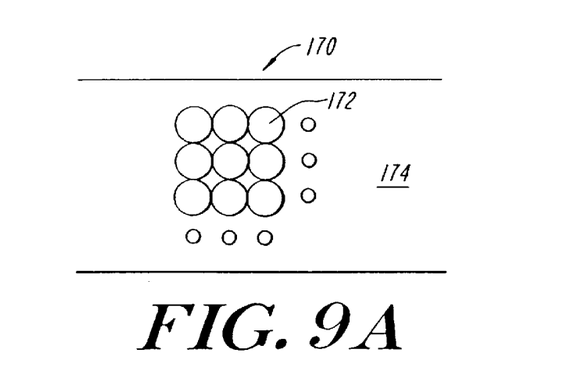
FIGS. 9a–9b illustrate the use of the invention in arrays.
Figure 9B:
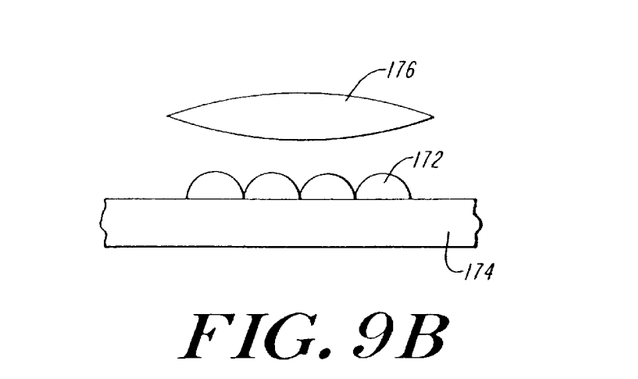
Figure 10:
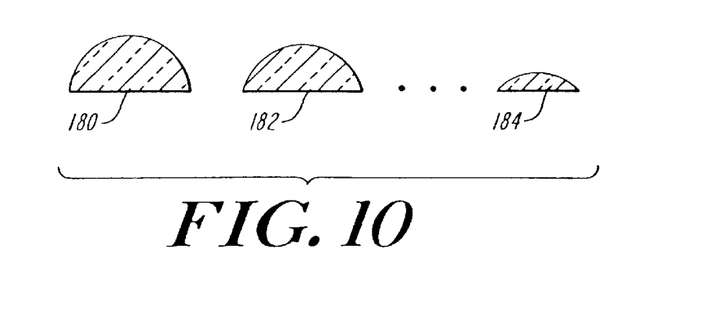
FIG. 10 illustrates a set of NAILs according to the invention.

The invention is also useful in Raman spectroscopy for detecting Raman scattering from within substrates. FIG. 9a–9b illustrate an array 170 of NAILs 172 according to the invention on a substrate 174. A single objective lens 176 can then be used with a plurality of the NAILs 172. This provides the advantage of a broader field of view. Additionally, by using NAILs 172 of different geometry's, different depths within substrate 174 can be viewed in aberration free focus. FIG. 10 illustrates a set of NAILs 180, 182 . . . 184, typically of the same or similar radius, useful in practicing the invention.

In practicing the invention with an optical system of external lenses, such as exemplified by FIG. 1, overall correction of chromatic aberration can be accomplished by the combined optical properties of the NAIL and other system optics. The invention utilizing correction of chromatic aberration also allows broad spectral correction at IR wavelength for thermal imaging, and near-IR wavelengths for visual inspection of semiconductor circuits and devices.

What is claimed is:

1. A lens for use in a system for coupling light into or from a substrate of a material through a surface thereof, said substrate containing a fabricated structure below the surface that emits blackbody radiation, thereby allowing for thermal imaging,
   said lens having a first surface matching the surface of said substrate and a second surface having a convex shape;
   said lens having a zone of focus in which said fabricated structure is contained, when the first surface thereof is in contact with said substrate surface; and
   said light passing through said convex surface with phase fronts geometrically distinct from said convex surface shape.

2. The lens of claim 1 wherein the index of refraction of the lens and the substrate are matched.

3. The lens of claim 1 wherein said lens and said substrate are formed of substantially the same material.

4. The lens of claim 1 wherein said substrate is fabricated of a semiconductor material.

5. The lens of claim 4 wherein said semiconductor material is selected from the group consisting essentially of Si, Ge, SiGe, GaAs, GaSb, GaP, InP, GaN or combinations thereof.

6. The lens of claim 1 wherein said convex surface shape is spherical.

7. The lens of claim 6 wherein said lens has a radius of curvature, R, and said material has an index of refraction, n, and said zone of focus occurs at a radius of R/n from the geometrical center of said spherical convex surface.

8. An optical system including one or more lenses in combination with one or more lenses of claim 1 to provide correction of chromatic aberration.

9. An optical system including one or more lenses of claim 1 responsive to light from said lens to provide imaging thereof with enhanced resolution of objects at said zone of focus.

10. An optical system including a lens for coupling light into or from a substrate,
    the lens having a first surface matching a surface of said substrate and a second surface having a spherical convex shape;
    the lens having a zone of focus, when the first surface thereof is in contact with said substrate surface, within said substrate;
    said light passing through said convex surface with phase fronts geometrically distinct from said convex surface shape;
    wherein said lens has a radius of curvature, R, and said material has an index of refraction, n, and said zone of focus occurs at a radius of R/n from the geometrical center of said spherical convex surface,
    and wherein said zone of focus is aberration corrected and extends over a range of radii such that a surface cutting said zone orthogonal to the radius has a region of aberration corrected focus.

11. The lens of claim 10 wherein said focus zone has said cutting surface parallel to said substrate surface.

12. An optical system including an array of lenses for coupling light into or from a substrate, each lens:
    having a first surface matching a surface of said substrate and a second surface having a convex shape; and
    having a zone of focus, when the first surface thereof is in contact with said substrate surface, within said substrate;
    said light passing through said convex surface with phase fronts geometrically distinct from said convex surface shape;
    and said optical system being responsive to light from said lenses to provide imaging of objects at said zone of focus.

13. An optical system including a lens for coupling light into or from a substrate,
    the lens having a first surface matching a surface of said substrate and a second surface having a convex shape;
    the lens having a zone of focus, when the first surface thereof is in contact with said substrate surface, within said substrate;
    said light passing through said convex surface with phase fronts geometrically distinct from said convex surface shape;
    and said optical system being responsive to light from said lenses to provide imaging of objects at said zone of focus,
    the optical system further including an objective lens or set of lenses for adjusting the depth of said zone of focus in said substrate.

14. An optical system including a lens for coupling light into or from a substrate,
    the lens having a first surface matching a surface of said substrate and a second surface having a convex shape;
    the lens having a zone of focus, when the first surface thereof is in contact with said substrate surface, within said substrate;
    said light passing through said convex surface with phase fronts geometrically distinct from said convex surface shape;
    said optical system being responsive to light from said lenses to provide imaging of objects at said zone of focus,
    said optical system having an objective lens and an exit lens whose principle points are separated by a distance, d, according to the relationship d=f1+f2+f12/R(n+1/n), R being the radius of curvature of the lens and n being an index of refraction for said lens and substrate.

15. An optical system including a lens for coupling light into or from a substrate,
the lens having a first surface matching a surface of said substrate and a second surface having a convex shape;
the lens having a zone of focus, when the first surface thereof is in contact with said substrate surface, within said substrate;
said light passing through said convex surface with phase fronts geometrically distinct from said convex surface shape;
said optical system being responsive to light from said lenses to provide imaging of objects at said zone of focus,
said optical system providing broad spectral chromatic aberration correction at IR wavelengths for thermal imaging.

16. An optical system including a lens for coupling light into or from a substrate,
the lens having a first surface matching a surface of said substrate and a second surface having a convex shape;
the lens having a zone of focus, when the first surface thereof is in contact with said substrate surface, within said substrate;
said light passing through said convex surface with phase fronts geometrically distinct from said convex surface shape;
said optical system being responsive to light from said lenses to provide imaging of objects at said zone of focus,
said optical system providing for operation at near-IR wavelengths for through the substrate visual inspection of semiconductor circuits and devices.

17. An optical system including a lens for coupling light into or from a substrate,
the lens having a first surface matching a surface of said substrate and a second surface having a convex shape;
the lens having a zone of focus, when the first surface thereof is in contact with said substrate surface, within said substrate;
said light passing through said convex surface with phase fronts geometrically distinct from said convex surface shape;
said optical system being responsive to light from said lenses to provide imaging of objects at said zone of focus,
the optical system including a system for measuring Raman scattering.

18. An optical system including a lens for coupling light into or from a substrate,
the lens having a first surface matching a surface of said substrate and a second surface having a convex shape;
the lens having a zone of focus, when the first surface thereof is in contact with said substrate surface, within said substrate;
said light passing through said convex surface with phase fronts geometrically distinct from said convex surface shape;
said optical system being responsive to light from said lenses to provide imaging of objects at said zone of focus,
the optical system including a system for time-resolved measurements.

19. A lens for coupling light into or from an object a distance X below a surface thereof,
said lens comprising a material having an index of refraction n substantially equal to the index of refraction of said object,
said lens having a first surface matching said surface of said object and a second surface opposite said first surface, said second surface having a spherical convex shape with a radius of curvature R,
and said lens having a thickness D substantially satisfying the following relationship: $D=R(1+1/n)-X$.

20. The lens of claim 19 wherein said light includes rays in the IR, visible, or UV spectrum.

21. The lens of claim 19 wherein said lens and said object are formed of substantially the same material.

22. The lens of claim 19 wherein said object is a semiconductor substrate and said lens is fabricated of the same semiconductor material.

23. The lens of claim 22 wherein said semiconductor material is selected from the group consisting essentially of Si, Ge, SiGe, GaAs, GaSb, GaP, InP, GaN or combinations thereof.

24. The lens of claim 22 wherein said substrate contains a fabricated structure including devices and circuits located at or near said distance X below the surface.

25. The lens of claim 22 wherein said substrate contains a fabricated structure that emits blackbody radiation at or near said distance X below the surface, thereby allowing for thermal imaging.

26. The lens of claim 22 wherein said substrate is a Silicon-on-Insulator wafer with a boundary at said zone of focus.

27. The lens of claim 22 wherein said substrate includes a semitransparent metal on a surface thereof at said zone of focus.

28. An optical system including one or more lenses in combination with one or more lenses of claim 32 to provide correction of chromatic aberration.

29. An optical system including a lens of claim 32 and being responsive to light from said lens to provide imaging at said distance X below the surface of the object.

30. The optical system of claim 29 further including an objective lens for adjusting the distance X.

31. The optical system of claim 29 having an objective lens and an exit lens whose principle points are separated by a distance d according to the relationship $d=f1+f2-f1^2/R(n+1/n)$, R being a radius of curvature of a surface of said lens and n being an index of refraction for said lens and said object.

32. The optical system of claim 29 wherein said optical system provides broad spectral chromatic aberration correction at IR wavelengths for thermal imaging.

33. The optical system of claim 29 wherein said object is a semiconductor substrate, and providing for operation at near-IR wavelengths for through-the-substrate visual inspection of semiconductor circuits and devices.

34. The optical system of claim 29 including a system for measuring Raman scattering.

35. The optical system of claim 29 including a system for time-resolved measurements.

36. A lens for coupling light into or from an object a distance X below a surface thereof, said viewing system having predefined working distance W,
said lens comprising a material having an index of refraction n substantially equal to the index of refraction of the object,
and said lens having a lower surface matching the surface of said object and an upper surface having a spherical convex shape with a radius of curvature R, the radius R being less than substantially $W/(n+1)$.

37. The lens of claim 36 wherein said light includes rays in the IR, visible, or UV spectrum.

38. The lens of claim 36 wherein said lens and said object are formed of substantially the same material.

39. The lens of claim 36 wherein said object is a semiconductor substrate and said lens is fabricated of the same semiconductor material.

40. The lens of claim 39 wherein said semiconductor material is selected from the group consisting essentially of Si, Ge, SiGe, GaAs, GaSb, GaP, InP, GaN or combinations thereof.

41. The lens of claim 39 wherein said substrate contains a fabricated structure including devices and circuits located at or near said distance X below the surface.

42. The lens of claim 39 wherein said substrate contains a fabricated structure that emits blackbody radiation at or near said distance X below the surface, thereby allowing for thermal imaging.

43. The lens of claim 39 wherein said substrate is a Silicon-on-Insulator wafer with a boundary at said zone of focus.

44. The lens of claim 39 wherein said substrate includes a semitransparent metal on a surface thereof at said zone of focus.

45. An optical system including one or more lenses in combination with one or more lenses of claim 36 to provide correction of chromatic aberration.

46. An optical system including a lens of claim 36 and being responsive to light from said lenses to provide imaging at said distance X below the surface of the object.

47. The optical system of claim 36 further including an objective lens for adjusting the distance X.

48. The optical system of claim 36 having an objective lens and an exit lens whose principle points are separated by a distance d according to the relationship $d=f_1+f_2-f_1^2/R(n+1/n)$, R being a radius of curvature of a surface of said lens and n being an index of refraction for said lens and said object.

49. The optical system of claim 36 wherein said optical system provides broad spectral chromatic aberration correction at IR wavelengths for thermal imaging.

50. The optical system of claim 46 wherein said object is a substrate, and providing for operation at near-IR wavelengths for through-the-substrate visual inspection of semiconductor circuits and devices.

51. The optical system of claim 46 including a system for measuring Raman scattering.

52. The optical system of claim 46 including a system for time-resolved measurements.

\* \* \* \* \*

UNITED STATES PATENT AND TRADEMARK OFFICE
CERTIFICATE OF CORRECTION

PATENT NO.   : 6,687,058 B1
DATED        : February 3, 2004
INVENTOR(S)  : Stephen B. Ippolito et al.

It is certified that error appears in the above-identified patent and that said Letters Patent is hereby corrected as shown below:

Title page,
Item [57], ABSTRACT,
Line 7, "index of retraction" should read -- index of refraction --;

Column 1,
Line 27, "$\gamma / (2\ NA)$ where $\gamma$" should read -- $\lambda / (2\ NA)$ where $\lambda$ --;

Column 7,
Line 51, "d=f1+f2+f12/R (n+1/n)," should read -- d=f1+f2-f12/R (n+1/n), --; and Column 8,
Lines 37 and 39, "claim 32" should read -- claim 19 --.

Signed and Sealed this

Twenty-eighth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,687,058 B1
DATED : February 3, 2004
INVENTOR(S) : Stephen B. Ippolito et al.

It is certified that error appears in the above-identified patent and that said Letters Patent is hereby corrected as shown below:

Title page,
Item [57], ABSTRACT,
Line 7, "index of retraction" should read -- index of refraction --;

Column 1,
Line 27, "$\gamma / (2\ NA)$ where $\gamma$" should read -- $\lambda / (2\ NA)$ where $\lambda$ --;

Column 7,
Line 1, "$d=f1+f2+f12/R\ (n+1/n)$," should read -- $d=f1+f2-f12/R\ (n+1/n)$, --; and Column 8,
Lines 37 and 39, "claim 32" should read -- claim 19 --.

This certificate supersedes Certificate of Correction issued December 28, 2004.

Signed and Sealed this

Third Day of May, 2005

JON W. DUDAS
*Director of the United States Patent and Trademark Office*